United States Patent

[11] 3,616,384

[72] Inventors Yan Karlovich Litsis
ulitsa Lachplesha, 70a, kv. 14;
Bruno Andreevich Purin, ulitsa Vilisa
Latsisa, 2a, kv. 11, both of Riga, U.S.S.R.
[21] Appl. No. 873,397
[22] Filed Nov. 3, 1969
[45] Patented Oct. 26, 1971

[54] METHOD FOR THE PRODUCTION OF AMMONIUM PERRHENATE
1 Claim, 1 Drawing Fig.

[52] U.S. Cl. .................................................. 204/180 P,
204/82, 204/296
[51] Int. Cl. .................................................. B01d 13/02
[50] Field of Search ........................................ 204/180 P,
96, 301

[56] References Cited
UNITED STATES PATENTS
2,849,358 8/1958 Bergman et al. ............... 204/180 P
2,921,005 1/1960 Bodamer ....................... 204/72

OTHER REFERENCES
Schulz, " Electrodialytic Conversion of Uranyl Nitrate to Uranic Fluoride Salts," Industrial and Engineering Chemistry, Dec. 1958, pp. 1768–1770

*Primary Examiner*—John H. Mack
*Assistant Examiner*—A. C. Prescott
*Attorney*—Waters, Roditi, Schwartz & Nissen ABSTRACT: A method of manufacturing ammonium perrhenate which comprises carrying out the process of electrodialysis in a two-chamber electrodialysis apparatus furnished with a liquid diaphragm consisting of amyl, hexyl or heptyl alcohol, wherein the starting catholyte is a perrhenate ion-containing acidic solution and the starting anolyte consists of a 10-30 percent solution of ammonia, while the liquid diaphragm contains 0.05-0.1 percent by weight of 8-mercaptoquinoline.

PATENTED OCT 26 1971　　3,616,384
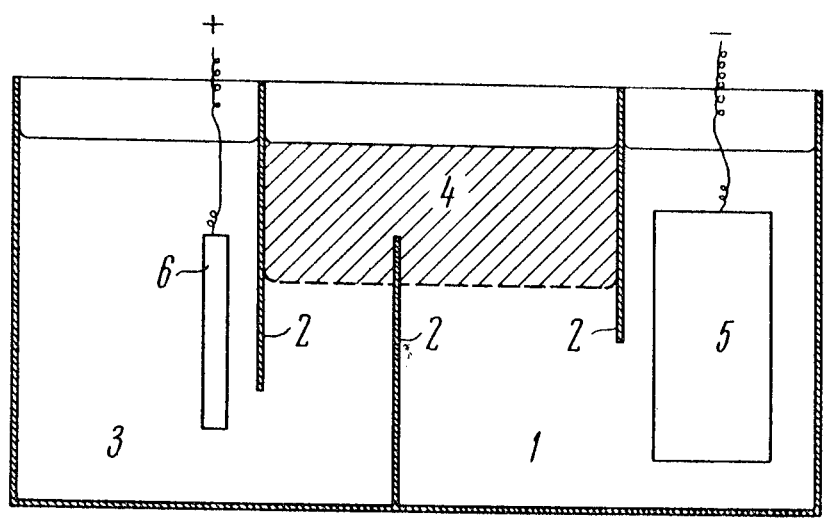

METHOD FOR THE PRODUCTION OF AMMONIUM PERRHENATE

This invention relates to methods for the production of ammonium perrhenate, which finds application for the manufacture of powdered rhenium in a high state of purity.

There are known processes of manufacturing ammonium perrhenate by the ion exchange technique, or by extraction with tributyl phosphate and subsequent reextraction by ammonia, or by dissolving rhenium metal in nitric acid, followed by neutralizing the resultant solution with ammonia.

It is also known to manufacture ammonium perrhenate from molybdenum concentrate processing wastes by a method comprising recovering perrhenate ions from said wastes by sorption on an ion exchange resin at pH of 5–6, followed by desorbing said ions by means of ammonia solutions.

These prior art methods are disadvantageous in that they are multistage and laborious processes, and do not make it possible to obtain high-purity ammonium perrhenate, other disadvantages being the consumption of significant quantities of organic solvents for extraction of perrhenate ions, and the necessity of carrying out the preliminary step of molybdenum separation from molybdenum concentrate processing wastes in order to effectively extract perrhenate ions from said wastes by sorption on ion exchange resins.

It is the principal object of the present invention to provide a single-stage method for the production of high-purity ammonium perrhenate from a perrhenate ion-containing solution and ammonia.

In accordance with this and other objects, the present invention consists of a method comprising carrying out the process of electrodialysis in ...

a two-chamber electrodialysis apparatus incorporating a liquid diaphragm made from amyl, hexyl or heptyl alcohol, wherein the process of electrodialysis is preceded by placing a perrhenate ion-containing acidic solution into the cathode compartment, a 10–300 percent ammonia solution into the anode chamber, and by incorporating 0.05–0.1 percent by weight of 8-mercaptoquinoline into the liquid diaphragm.

The present method for the production of high-purity ammonium perrhenate is illustrated by the accompanying diagram of the electrodialysis apparatus and realized in the following manner.

A perrhenate ion-containing acidic solution is charged into cathode compartment 1 of the electrodialysis apparatus, provision being made in said apparatus for partitions 2. A 10–3 percent solution of ammonia is placed in anode compartment 3, followed by introducing into the apparatus a normal or branched aliphatic alcohol, selected from the group of alcohols specified hereinabove so as to form liquid diaphragm 4. Next, 0.05–0.1 percent by weight of a complexing agent, viz., 8-mercaptoquinoline, is incorporated into diaphragm 4, and electrodes 5 and 6 are connected to a power source, the electrodes being selected so that the area of cathode 5 will be significantly larger (by a factor of 5 to 10) than that of anode 6, whereby the reduction of perrhenate ions in the cathode compartment is avoided. The cathode may be fabricated from any metal, while the anode should be made of platinum.

The liquid diaphragm selectively extracts in the cathode compartment the perrhenate ions in the form of perrhenic acid, which undergoes partial dissociation in the organic phase (alcohol), and the resultant perrhenate ions diffuse, under the effect of the electric field applied, through the liquid diaphragm to the alcohol-ammonia solution interface in the anode compartment and form in the anode chamber ammonium perrhenate which accumulates in the ammonia solution.

8-Mercaptoquinoline contained in the liquid diaphragm forms complex compounds with heavy metal admixtures that penetrate into the diaphragm from the cathode compartment solution, said complexes being insoluble in water, but readily soluble in aliphatic alcohols. It is to be noted that perrhenate ions form under these conditions no complexes wutg 8-mercaptoquinoline and, therefore, travel from the cathode compartment to the anode compartment via the liquid diaphragm, while the admixtures of heavy metals are trapped by the diaphragm or deposited on the cathode. In the cathode compartment, the solution will ultimately contain the admixtures of alkali and alkaline earth metals (potassium, sodium, calcium, etc.).

The unification of such processes as the extraction of perrhenate ions, removal of impurities by 8-mercaptoquinoline and electrodialysis makes it possible to obtain a solution of high-purity ammonium perrhenate by a single-step procedure.

The ammonium perrhenate solution thus obtained is directed to the crystallization step in order to obtain the sought-for ammonium perrhenate or subjected, after an appropriate adjustment of the composition, to electrolysis with a view to producing rhenium metal.

For a better understanding of the present invention, the following examples of preparing ammonium perrhenate are given by way of illustration.

EXAMPLE 1

In the cathode compartment, the electrolyte has the following composition: rhenium (as potassium perrhenate), 6.4 g./l.; sulfuric acid, 100 g./l.; molybdenum, 0.64 g./l. copper, 0.64 g./l.

In the anode compartment, the electrolyte consists of a 15 percent solution of ammonia. The liquid diaphragm is made from isoamyl alcohol containing 0.05 percent by weight of 8-mercaptoquinoline.

The process of electrodialysis is carried out at a cathodic current density of 1 A/dm$^2$ and an anodic current density of 5 A/dm$^2$, the cathode and anode being fabricated from steel and platinum, respectively.

After a 2 hour period of electrodialysis, the solution in the anode compartment acquires the following composition, as shown by extraction and photocolorimetric analysis: rhenium (in the form of ammonium perrhenate), 2.8 g./l.; molybdenum, under 0.0002 g./l.; copper, under 0.0001 g./l., and potassium, under 0.003 g./l.

EXAMPLE 2

In the cathode compartment, use is made of the electrolyte having the following composition: rhenium (as potassium perrhenate) 1 g./l.; sulfuric acid, 100 g./l; molybdenum, 10 g./l.

In the anode compartment, the electrolyte consists of a 10 percent solution of ammonia, while the liquid diaphragm is made of isoamyl alcohol containing 0.1 percent by weight of 8-mercaptoquinoline.

The process of electrodialysis is carried out under the conditions disclosed in example 1.

After a 4 hour period of electrodialysis, the solution in the anode compartment acquires the following composition: as shown by extraction and photocolorimetric analysis, rhenium (in the form of ammonium perrhenate), 0.8 g./l.; molybdenum, under 0.0002 g./l.; and potassium, under 0.003 g./l.

The absence of perrhenate ions in the cathode compartment after the aforesaid period of electrodialysis is indicative of complete perrhenate ion removal from the initial catholyte.

EXAMPLE 3

In the cathode compartment, use is made of the electrolyte having the following composition: rhenium (as potassium perrhenate), 6.4 g./l.; sulfuric acid, 100 g./l.; molybdenum 0.64 g./l.

In the anode compartment, the electrolyte consists of a 15 percent solution of ammonia, while the liquid diaphragm is composed of n-hexyl alcohol containing 0.05 percent by weight of 8-mercaptoquinoline.

The process of electrodialysis is conducted under the conditions disclosed in example 1.

After a 2 hour period of electrodialysis, the solution in the anode compartment acquires the following composition, as shown by extraction and photocolorimetric analysis: rhenium (in the form of ammonium perrhenate), 1.8 g./l.; molybdenum, under 0.0002 g./l. and potassium, under 0.003 g./l.

EXAMPLE 4

The composition of the starting catholyte and anolyte is as disclosed in example 3, but the liquid diaphragm consists of n-heptyl alcohol containing 0.05 percent by weight of 8-mercaptoquinoline.

The process of electrodialysis is conducted under the conditions of example 1.

After a 2 hour period of electrodialysis, the solution in the anode compartment acquires the following composition, as shown by extraction and photocolorimetric analysis: rhenium (in the form of ammonium perrhenate), 1.2 g./l.; molybdenum, under 0.0002 g./l., and potassium, under 0.003 g./l.

All the procedures described in examples involve the cathode compartment-to-liquid diaphragm-to-anode compartment volume ratio of 2:1:2, respectively, 0.15 A/hr being required to transfer 1 gram of rhenium from the cathode compartment to the anode compartment via the liquid diaphragm.

Although the present invention has been described with reference to the preferred embodiments thereof, many modifications and changes will occur to those skilled in the art. It is, therefore, to be understood that the appended claims are intended to cover all such modifications and changes as fall within the true spirit and scope of the invention.

We claim:

1. A method for the production of ammonium perrhenate which comprises carrying out the process of electrodialysis in a two-chamber electrodialysis apparatus having a liquid diaphragm made of an aliphatic monohydric alcohol selected from the group consisting of amyl, hexyl and heptyl alcohols, wherein the process of electrodialysis is preceded by placing in the cathode compartment a perrhenate ion-containing acidic solution and in the anode compartment a 10–30 percent solution of ammonia, and by incorporating into the liquid diaphragm 0.05–0.1 percent by weight of 8-mercaptoquinoline.

* * * * *